United States Patent
Ohtsu

(10) Patent No.: US 7,170,702 B2
(45) Date of Patent: Jan. 30, 2007

(54) SERVO BAND RECORDED MAGNETIC TAPE, MANUFACTURING METHOD OF THE SAME, SERVO BAND WRITER AND SERVO BAND WRITING METHOD

(75) Inventor: Hiroki Ohtsu, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 216 days.

(21) Appl. No.: 10/875,921

(22) Filed: Jun. 25, 2004

(65) Prior Publication Data
US 2005/0057839 A1    Mar. 17, 2005

(30) Foreign Application Priority Data
Sep. 11, 2003    (JP)    ............................. 2003-319373

(51) Int. Cl.
  *G11B 5/09*    (2006.01)
  *G11B 5/584*    (2006.01)
(52) U.S. Cl. .................... 360/48; 360/50; 360/77.12
(58) Field of Classification Search ................... None
  See application file for complete search history.

(56) References Cited

U.S. PATENT DOCUMENTS

| | | | |
|---|---|---|---|
| 4,996,609 A | 2/1991 | Joannou | |
| 5,689,384 A | 11/1997 | Albrecht et al. | |
| 6,278,571 B1 * | 8/2001 | Bui et al. | 360/77.12 |
| 6,347,016 B1 | 2/2002 | Ishida et al. | |
| 6,424,790 B1 * | 7/2002 | Ishii et al. | 386/69 |
| 6,970,312 B2 | 11/2005 | Yip et al. | |
| 7,002,763 B2 * | 2/2006 | Bui et al. | 360/48 |

FOREIGN PATENT DOCUMENTS

JP    2003-157634 A    5/2003

* cited by examiner

*Primary Examiner*—Wayne Young
*Assistant Examiner*—Daniell L. Negrón
(74) *Attorney, Agent, or Firm*—Sughrue Mion, PLLC

(57) ABSTRACT

The present invention provides servo band recorded magnetic tapes, manufacturing method of the tapes, servo band writers and servo band Writing method. The background magnetic flux transition zone is generated with one directional polarization of the magnetization along the servo bands on the magnetic recording tapes. The servo stripes are generated with the reverse polarity of magnetization in the background magnetic flux transition zone. Then the magnetic flux servo transition against the background has more contrast so that the detected servo signal which is differential signal can be maintained in a high level.

30 Claims, 8 Drawing Sheets

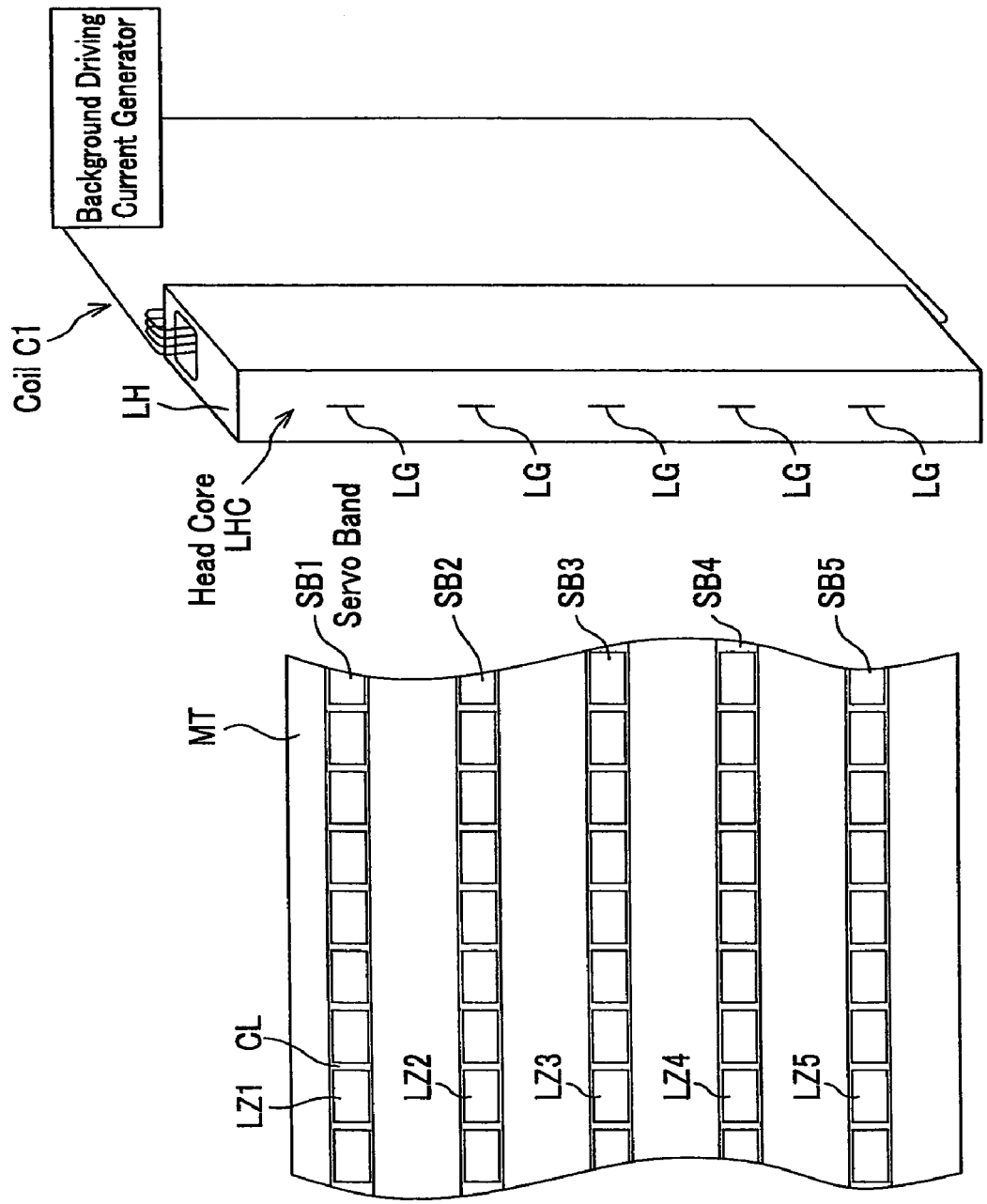

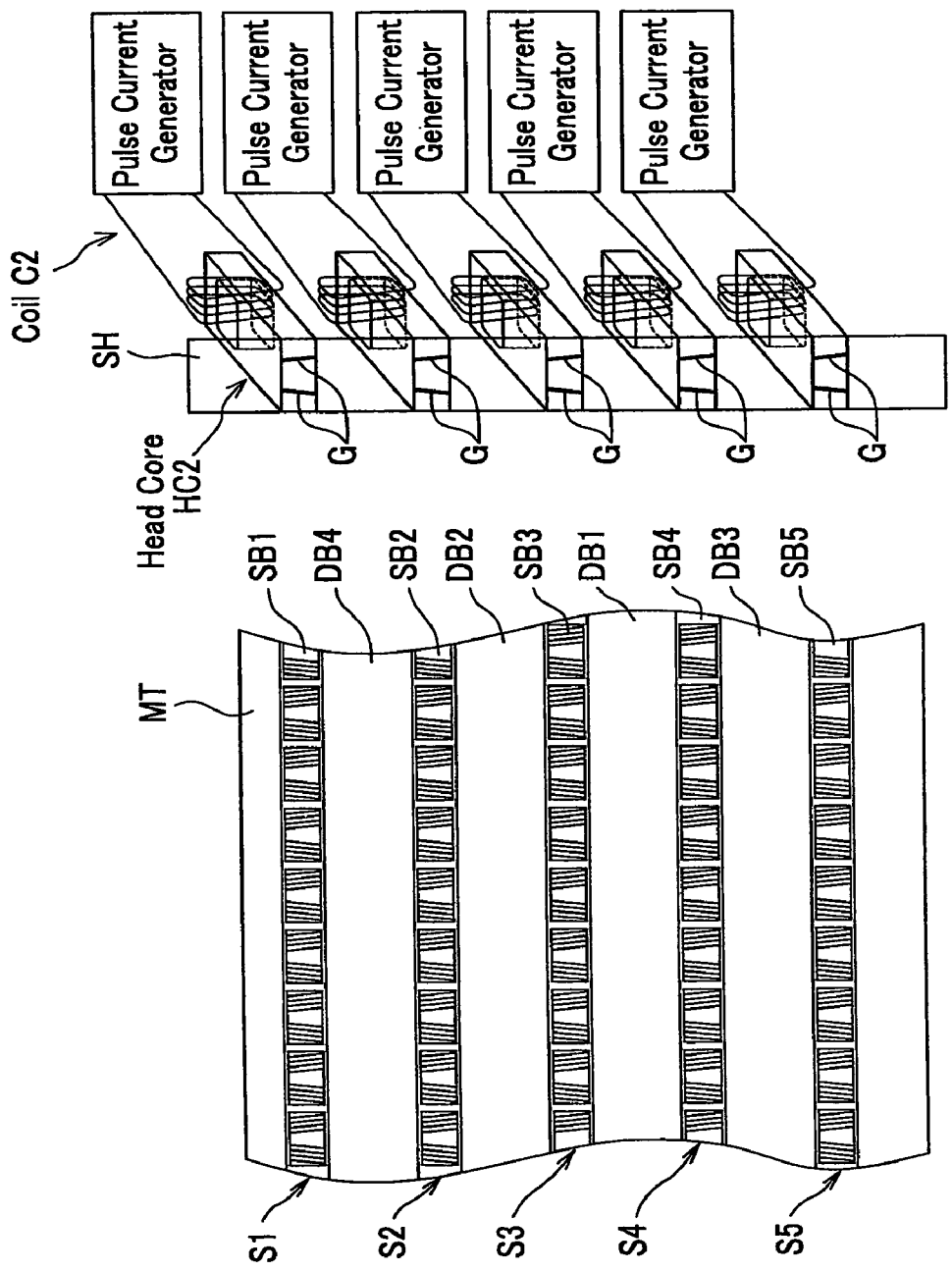

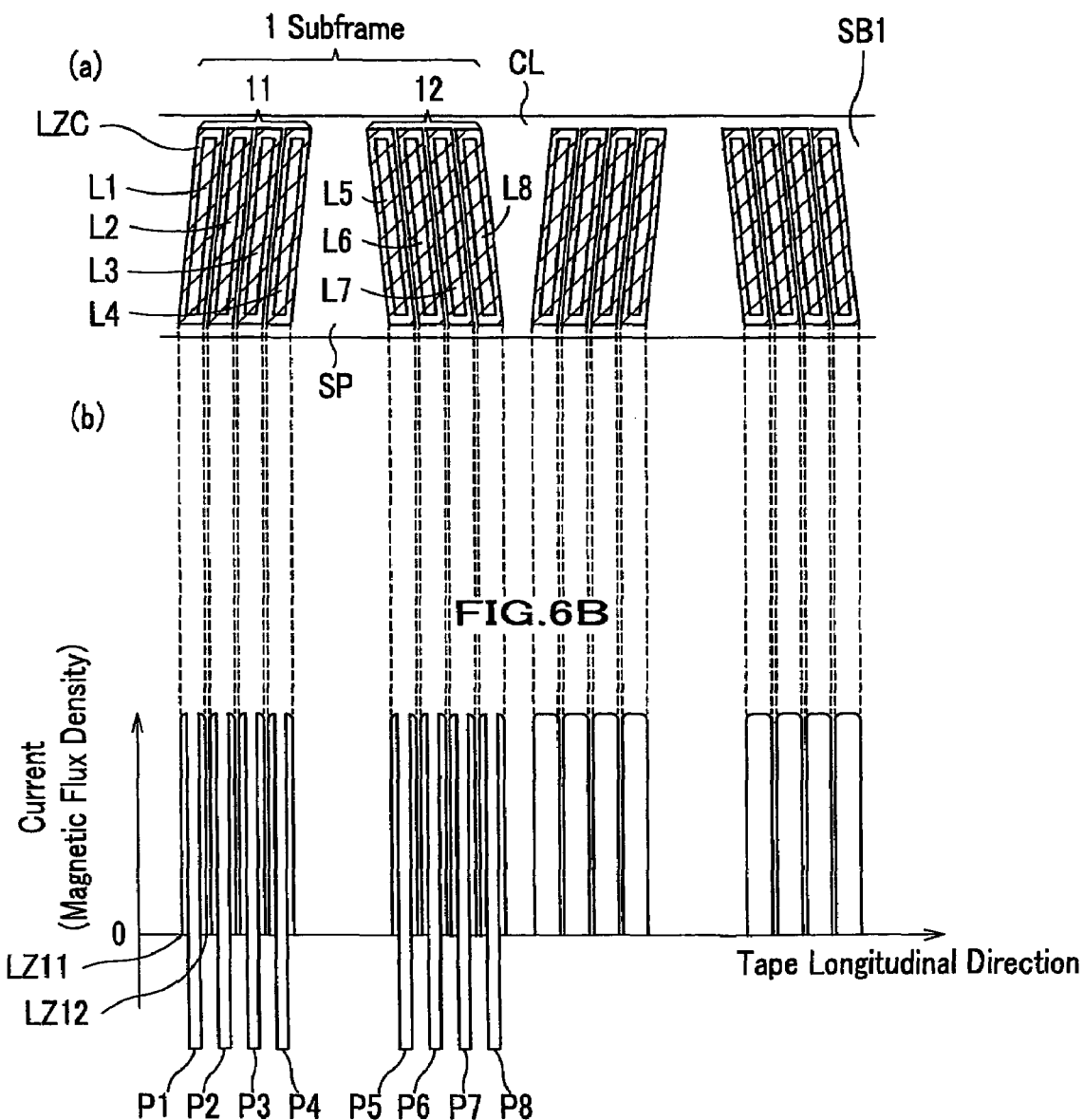

SERVO BAND RECORDED MAGNETIC TAPE, MANUFACTURING METHOD OF THE SAME, SERVO BAND WRITER AND SERVO BAND WRITING METHOD

FIELD OF THE INVENTION

The present invention relates to a magnetic tape which has a track onto which control marks used for the servo system equipped to tape drives is recorded as magnetic flux transition, a manufacturing method of the magnetic tape, a control mark recording apparatus and a control mark recording method.

In the present invention, we define "a track onto which a control mark is recorded", "a control mark recording apparatus" and "a control mark recording method" are called a servo band, a servo band writer and servo band writing method, respectively hereinafter. The technical words related to the present invention are kept to be compliant with Standard ECMA-319 "Data Interchange on 12, 7 mm 384-Track Magnetic Tape Cartridges-Ultrium-1 Format" issued in June, 2001.

BACKGROUND OF THE INVENTION

Recent magnetic tapes for computer backup have been innovatively improved in high density recording capabilities and characteristics. It is predictable that large recording capacity tapes as several tens Terra bytes capacity a reel will be able to be made in the near future. For this high density recording, the more the magnetic tapes have data tracks, the narrower the widths of the data tracks and the gaps between two adjacent data tracks are to be shrunk down. The grain size of the magnetic material is reduced to obtain the finer recording pattern for such shrink down than before. The film base of the magnetic tape becomes thinner so that the longer tapes are obtained for a reel of the magnetic tape without increasing the reel diameters. According to increasing of the data tracks to realize high data recording capacity, the frequency to read or write the magnetic tape increases due to the serpentine read/write over the magnetic tape. It is quite important to consistently and correctly read the control signal recorded on the track. We call the signal obtained by a magnetic transducer which senses the control mark magnetically recorded on the track "a detected servo signal", the track on which the control marks are magnetically recorded "a servo band" and the magnetically recording of a control mark onto a track "servo band writing" or "servo writing" in short. The control mark is physically a magnetic flux transition of the magnetic material which is coated on a magnetic tape. The scale down technology requires the small size magnetic transducers for both data recording onto the magnetic tape as magnetic flux transitions and data reproducing from such magnetic flux transition patterns recorded on the magnetic tape. The scale down technology also requires small dimension of the control marks recorded as the magnetic flux servo transition pattern as well as narrowing the data tracks and the servo bands. It is necessary to keep the high S/N in reading out the recorded data due to the small size magnetic flux transition patterns recorded on the narrowed tracks, especially for the servo bands. More specifically, the high signal resolution is necessary to precisely read out the control marks recorded as magnetic flux servo transition patterns, in other words the servo bands, by means of small size magnetic transducer. By this appropriate lateral positioning of the magnetic head to the servo bands, the correct reading of the data recorded in magnetic flux transition patterns on the data tracks which are adjacent to the servo bands becomes possible. For this purpose, the enhancement of the resolution of servo signal read becomes important to realize a correct tracking of the servo bands.

There are two schemes for the magnetic head lateral positioning control using the servo bands. One is an amplitude servo method by using the width of magnetic flux servo transition pattern recorded on the servo band which is read by the servo band read head and the other a timing-based servo method by using the signal timing in synchronous to servo burst in the servo bands. In the timing-based servo scheme, non-parallel pattern of magnetic flux servo transition stripes (called "servo stripes" hereinafter) is recorded on the servo band by the servo recording heads while the tape is fed through a servo writer. For this servo writer, magnetic recording heads fabricated by photolithography are used for the purpose of fine patterning of magnetic gap portion. The servo stripes are generated by the magnetic flux leaked at the magnetic gap of the magnetic head (see, for example, reference 1).

FIG. 8 shows the generating and reading the servo stripes in the conventional timing-based servo scheme.

When the current pulse is applied to the magnetic head, a servo stripe is generated as a magnetic flux servo transition by the magnetic flux leaked from the magnetic gap of the magnetic head. This magnetization can be done in a single pole due to the single polarity of the current pulse. On the other hand, no magnetic flux transition is generated when the current pulse is not applied to the magnetic head. The intensity of the current pulse PC to generate servo stripes is limited not to saturate a magnetic resistance (abbreviated as "MR") element used for the magnetic head.

In the magnetic tape read out operation, the MR element used for the servo magnetic head senses the magnetic flux transition as the change of the resistance. The change of the resistance is measured by the voltage. The larger the change of the resistance, the better the S/N of the detected servo signal. The peak of the detected servo signal is in proportion to the amount of the magnetization of each servo stripe if the MR element has no saturation. Therefore, if the amount of the magnetization of the servo stripe is large then the peak voltage value of the detected servo signal RSL is large.

According to the requirement for large recording capacity tapes, the width of the servo band is shrunk down so that the magnetic flux to the transducer to sense the servo stripe becomes small. In the shrinking rule that is based on the principle of constant magnetic flux per area (which is magnetic flux density), when the thickness of the magnetic material decreases, then the magnetic flux becomes much less as in a rule of cubic in such shrink down of the scale. Therefore the detected servo signal RSS that is for the large recording capacity tapes decrease. On the other hand, the noise generated by the transducer is not scaled down in a rule of cubic. As the result, the S/N for RSS becomes worse and the stable signal revel corresponding to the servo magnetic head position onto the servo band is hardly obtained and the precise lateral position control of the magnetic head becomes difficult as far as using such detected servo signal RSS.

Reference 1:
Published Japanese Patent Application: Paragraph 0007 and the FIG. 5, JP, 2003-157634, A (2003)
Reference 2:
U.S. Pat. No. 5,689,384

BRIEF SUMMARY OF THE INVENTION

The present invention has an advantage such that the S/N can be improved even the scale down of the servo bands and the thinning of the magnetic layer due to the shrink down which is necessary for the large recording capacity tapes and therefore stable detected servo signal can be obtained without the relative increase of noises. As the result, the present invention can realize the magnetic tape and the manufacturing method where the precise positioning of the magnetic head is obtained.

The present invention has another advantage to improve the S/N of the detected servo signal obtained by the servo magnetic head and has a further advantage to provide the servo band writer and servo band writing method.

In order to improve the S/N of the detected servo signal, the present invention provides the servo stripes generated in the subframes which are in the servo bands and work as the background of the reverse polarity of magnetization against that of the servo stripes. Then the magnetic flux servo transition stripes against the background have more contrast than the conventional servo band where the servo stripes are generated on the servo bands. As the result, the detected servo signal which is a differential signal can be maintained in a high level.

As the result of present invention, the change of magnetic flux servo transition on the magnetic tape can be doubled without the effect of saturation of an MR head. Therefore the level of S/N is maintained even for large recording capacity tapes.

For the differences of the background, the present invention has several variations. For instance, the background magnetic flux transition may be generated on each of the subframes, on each of servo burst domains that includes servo burst or on each of servo stripes where new servo stripes are generated in the reverse magnetic polarization. The present invention has another advantage such that servo writers are constructed to generate such magnetic flux transition configuration for servo stripes in the servo bands. The further advantage of the present invention is to provide the writing method of the servo band as described before.

BRIEF DESCRIPTION OF THE DRAWINGS

FIG. 2A is a schematic diagram that shows a background magnetic flux transition zone of the servo band of the present inventions.

FIG. 2B is a schematic diagram that shows the servo magnetic heads LH to generate the background magnetic flux transition zones.

FIG. 3A is a schematic diagram that shows the servo band on which the magnetic flux transition zones of the servo bands and the servo stripes of the present invention are generated.

FIG. 3B is a schematic diagram that shows the servo magnetic heads SH.

FIG. 6A is a schematic diagram that shows the other servo band on which the magnetic flux transition zones of the servo bands and the servo stripes regarding the present invention are generated.

FIG. 6B is the detected current by the servo magnetic head sliding on the servo band shown in FIG. 6A.

DETAILED DESCRIPTION OF THE INVENTION

We will explain the embodiments of the present invention, more specifically, magnetic tapes, a manufacturing method of the magnetic tapes, a servo band writer and servo band writing method, by using the figures.

Figure 1:
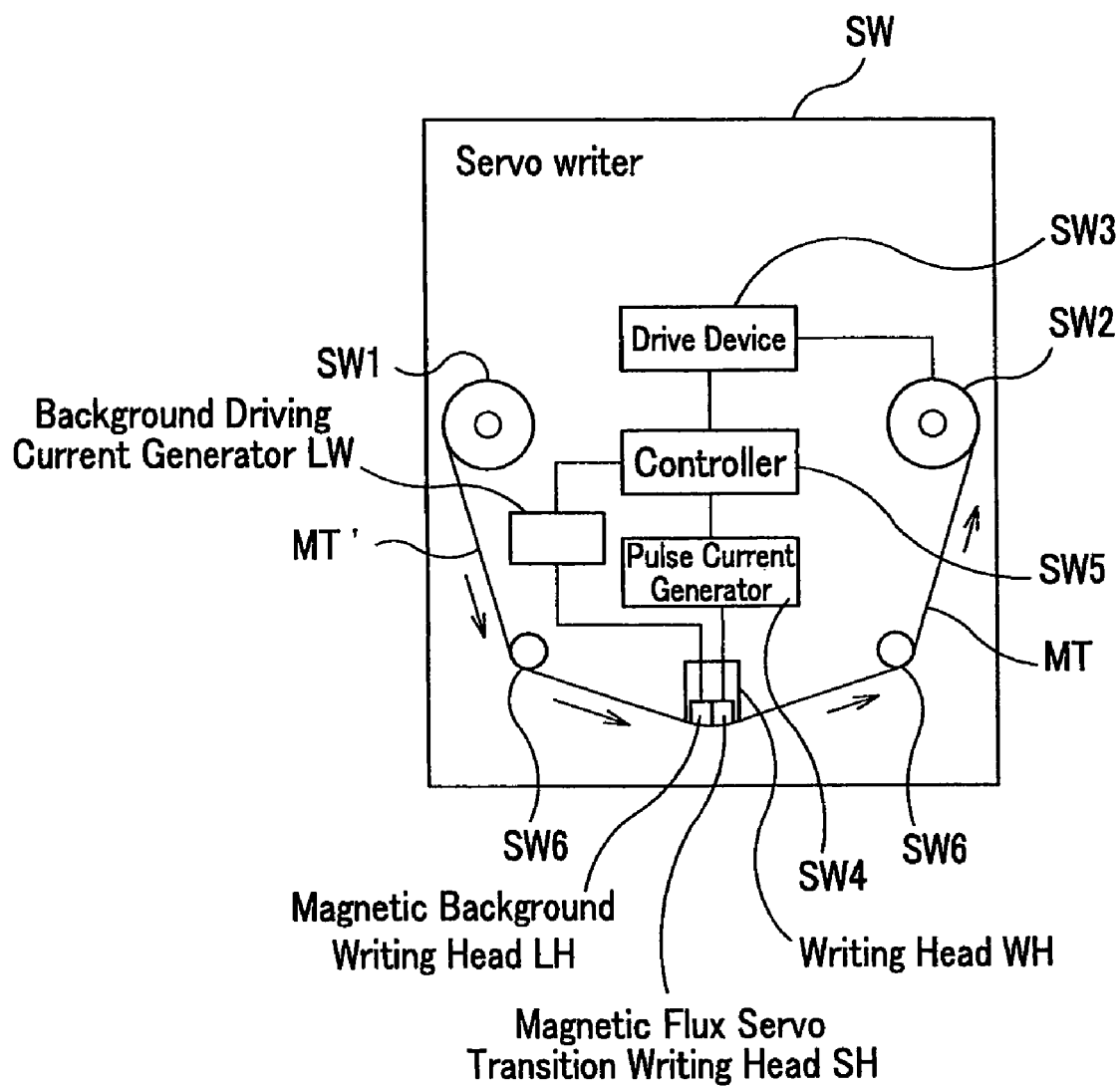
FIG. 1 is a schematic diagram that shows the servo writer of the present invention.

FIG. 1 shows a servo writer SW regarding the present invention. It comprises a feeding reel SW1, a rewinding reel SW2, a drive device SW3, a background driving current generator LW, a magnetic background writing head LH, a pulse generator SW4, a writing head WH and a controller SW5. Other than these components, this servo writer is equipped with a power supply, a tape cleaning apparatus and a verifier of magnetic flux servo transition which are not shown in the figures.

In the feeding reel SW1, a reel wound tape with a large diameter, which is so called "pancake" that is a wound tape cut out from a web into an ECMA-319 tape width in web roll, is set. The magnetic tape MT' is fed out to generate magnetic flux servo transition patterns S1 to S5 in the five servo bands as SB1 to SB5.

The operation of the servo writer is explained as follows. The fed out tape is processed to have background magnetic flux transition zones LZ which are discrete subframes in a series along the tape longitudinal direction, so that a servo frame is composed of a subframe and an inter break CL. The background magnetic flux transition zones LZ are magnetized by the magnetic background writing head LH in a polarization, which we assume to be a positive polarization.

Then the fed out tape is processed to have servo bursts generated on the background magnetic flux transition zones LZ by a magnetic flux servo transition writing head SH which is located in the down stream of the tape feeding, as shown in FIG. 3. The servo bursts composing the servo stripes are generated by the magnetic flux transition stripe patterns in which the magnetic polarization is in the reverse direction (as se assume to be a negative polarization) against the magnetization of background magnetic flux transition zones LZ. After generating completion magnetic flux servo transition patterns S1 to S5 in the above process, the magnetic tape is guided to a winding reel SW2 through a guide SW6. The winding reel SW2 is rotated by a drive device SW3 and takes in the magnetic tape MT which has been completed in servo band writing.

The drive device SW3 comprises a motor, a motor circuit and step down gears which are not shown in the figures. The electric power is controlled by a controller SW5 and supplied to the motor in the drive device SW3. The rotation force of the motor is transmitted to the winding reel SW2 via step down gears.

The background driving current generator LW supplies current pulses to a coil Cl (see FIG. 2) which is wound around a magnetic background writing head core LHC which has five magnetic leak gaps to generate background magnetic flux transition zones LZ in parallel to the tape longitudinal direction. The current pulse generated by the background driving current generator LW based on the control of the controller SW5 has the predetermined time duration and time interval to generate the subframe patterns of the background magnetic flux transition zones LZ. A single coil C1 drives five magnetic circuits installed in the magnetic background writing head core LHC and the polarity of the magnetization of the background magnetic flux transition zones LZ can be in the same direction. Therefore, the inter breaks CL and the five background magnetic flux transition zones LZ1 to LZ5 which are discrete subframes are generated in a series along the tape longitudinal direction onto the corresponding five servo bands. The intensity of the current pulse is sufficient to make a leak magnetic field at the leak gap LG that is enough to make saturation magnetization in the servo band. The longitudinal dimensions of the background magnetic flux transition zones LZ and the inter breaks CL are determined by the time duration of current pulses and tape feeding speed.

The magnetic background writing head LH has five leak gaps by which servo burst are generated.

A current pulse generator SW4 supplies the current pulse to a coil C2 (see FIG. 3) which is wound around a magnetic flux servo transition writing head core HC2. The current pulse generator SW4 is attached to each of the coils wound around the magnetic flux servo transition writing head cores SH. Particularly, the current pulse generator SW4 supplies current pulse to the coils C2 based on the control signal given by the controller SW5 by which the servo bursts composing of the magnetic flux transition stripe patterns in which the magnetic polarization is in the reverse direction (as se assume to be a negative polarization) against the magnetization of background magnetic flux transition zones LZ1 to LZ5 on the servo bands SB1 to SB5 are generated in a predetermined interval. The intensity of the current pulse is sufficient to make leak magnetic fields at the leak gaps G that are enough to make saturation magnetization in the servo band.

As shown in FIG. 3, the magnetic flux servo transition writing head core SH has a pair of non-parallel gaps G which generates servo stripes that are magnetic flux servo transition patterns S1 to S5 corresponding to the servo bands SB1 to SB5.

The alignment of the non-parallel gaps G in the direction of the width of the magnetic tape is precisely set to meet the tracks of servo bands SB1 to SB5. However the alignment in the direction of the tape longitudinal direction can be less precise as far as the order of the servo band can be identified. Therefore, the servo bursts can be generated with offset each other and servo band ID can be embedded in the servo burst patterns.

The writing method to generate servo stripes that are magnetic flux servo transition patterns S1 to S5 on the magnetic tape by using the servo writer SW is explained with FIG. 1.

The mechanism shown in FIG. 1 feeds out and takes in the magnetic tape MT'. While the magnetic tape is fed out and taken in, the background driving current generator LW supplies current pulses to a coil C1 (see FIG. 2) which is wound around a magnetic background writing head core LHC of the magnetic background writing head LH. Then five magnetic leak gaps in the magnetic background writing head core LHC generate magnetic fields to generate a background magnetic flux transition zones LZ1 to LZ5 in parallel to the tape longitudinal direction. Since the current pulse has the predetermined time duration and time interval, the background magnetic flux transition zones LZ has the subframe patterns with inter breaks CL. As shown in FIG. 2(a), five servo bands SB1 to SB5 are composed of the inter breaks CL and the background magnetic flux transition zones LZ1 to LZ5 on which the subframe patterns are generated.

The magnetic tape is then fed to a magnetic flux servo transition writing head SH which is in the down stream in the servo writer SW.

The current pulse generator SW4 supplies the current pulse to a coil C2 (see FIG. 3) which is wound around a magnetic flux servo transition writing head core SHC of the magnetic flux servo transition writing head cores SH. Then the current pulse generator SW4 supplies current pulse to the coils C2 based on the control signal given by the controller SW5 by which the five magnetic leak gaps in the magnetic background writing head core SHC generate magnetic fields to generate the servo bursts composing of the magnetic flux transition stripes in which the magnetic polarization is in the reverse direction (as se assume to be a negative polarization) against the magnetization of background magnetic flux transition zones LZ1 to LZ5 on the servo bands SB1 to SB5 are generated in a predetermined interval in a form of gap patterns G. Finally, the magnetic flux servo transition patterns S1 to S5 is generated.

The alignment of the non-parallel gaps G in the direction of the width of the magnetic tape is precisely set to meet the tracks of servo bands SB1 to SB5. However the alignment in the direction of the tape longitudinal direction therefore the relative position on the background magnetic flux transition zone LZ can be less precise. Therefore after the relative lateral positioning of the magnetic background writing head LH to the magnetic flux servo transition writing head SH are adjusted to keep the alignment of the background magnetic flux transition zone LZ and the servo burst onto the servo bands SB1 to SB5, the timing of the feeding speed of the magnetic tape MT' can be controlled for the current pulse repetition time. This timing control may be done by control software installed in the servo writer.

The effects and the characters of the magnetic tape of the first embodiment in the present invention are explained as follows with reference to FIG. 3A and FIG. 4A.

The five servo bands SB1 to SB5 are generated in the tape longitudinal direction with the equal separation distance in the lateral direction as shown in FIG. 3A. The data bands DB1 to DB4 are generated between two servo bands. In each of the servo bands SB1 to SB5, a series of subframes are generated with inter breaks CL. The magnetic flux servo transition patterns S1 to S5 are generated and the tracking control of the magnetic head is carried out.

Figure 4A:
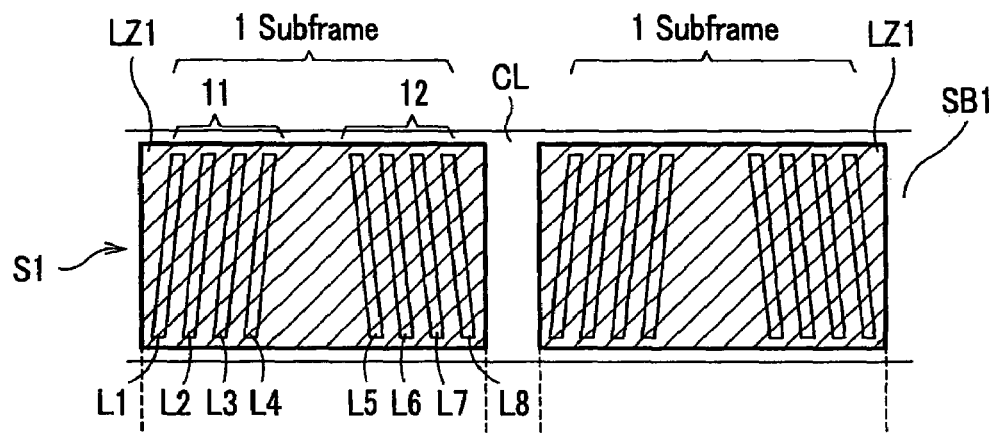
FIG. 4A is a schematic diagram that shows a servo band on which the magnetic flux transition zones of the servo bands and the servo stripes regarding the present invention are generated.

The servo pattern of the first embodiment of the servo bands recorded magnetic tape regarding the present invention is, as shown in FIG. 4A, composed of the subframe 1 and the servo stripes that are formed in the first four slanted stripes L1 to L4 and the second four slanted stripes L5 to L8 to the tape longitudinal direction where the four stripes are parallel within the first four slanted stripes and the second four slanted stripes but are not parallel between the first and the second four slanted stripes. It may be preferred that the first four slanted stripes L1 to L4 and the second four slanted stripes L5 to L8 are in a symmetry relation in the subframe 1 at the frame center line that is right angle to the tape longitudinal direction. The non-parallelism between the pairs as (L1, L5), (L2, L6), (L3, L7) and (L4, L8) are formed by the pair of non-parallel gaps G which the magnetic flux servo transition writing head core SH has. All of the distances and shapes of these pairs of servo stripes are identically same since the distances and the shapes are generated by the pair of non-parallel gaps G which the magnetic flux servo transition writing head core SH has.

Figure 4B:
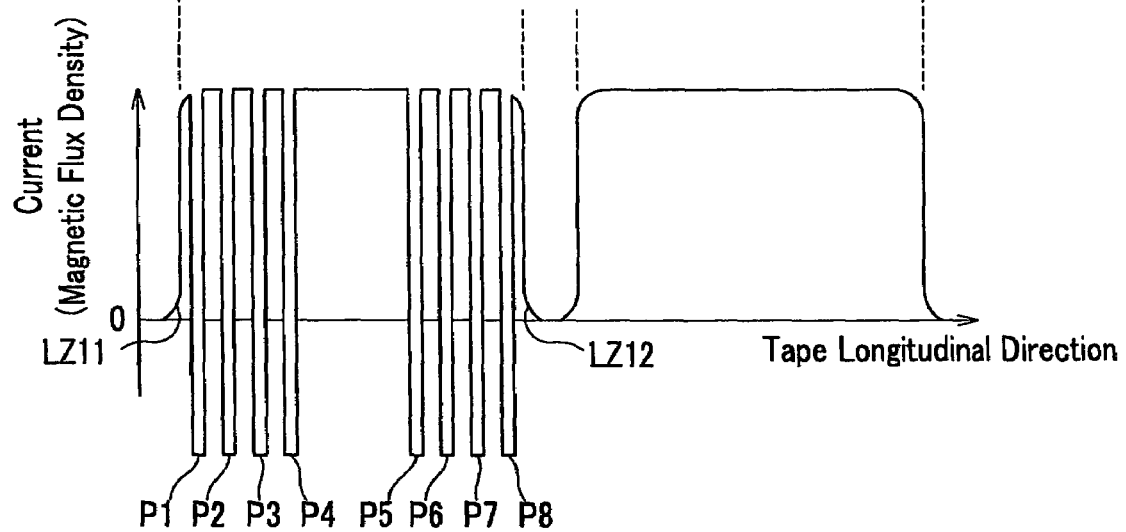
FIG. 4B is the detected current by the servo magnetic head sliding on the servo band shown in FIG. 4A.

As the result, the magnetic flux transition of the servo band SB1 has the background magnetic flux transition zone LZ1 in a positive direction of the predetermined intensity of magnetization. The magnetic flux transition of the servo band SB1 has the background magnetic flux transition zone LZC in a positive direction of the predetermined intensity of magnetization as shown in FIG. 4B (which is drawn with FIG. 4A to clarify the relation with the magnetic flux transitions and the detected current). The rising edge LZ11 and the falling edge LZ12 of the magnetic flux transitions are preferred to have transient areas along the longitudinal direction of the magnetic tape. For this purpose, the current pulse generated by the background driving current generator LW based on the control of the controller SW5 has the predetermined time duration and time interval to generate the background magnetic flux transition zones LZ1 and has a transient term for the current increasing and decreasing at the pulse head and the pulse tail, respectively. The gradual transient of the magnetic flux transition at the background magnetic flux transition zones LZ1 generates gentle time-varying current sensed by means of the magnetic tape reading head at the pulse head and tail in comparison to the transition in the magnetic flux transition of the serve stripes. On the other hand, the transient of the magnetic flux transition at the edge of the servo stripe is from a positive direction of the predetermined intensity of magnetization to a negative direction of the predetermined intensity of magnetization. This characteristic is exploited for the servo burst detection as a high current peak in the servo burst detection but the low current peak in the inter breaks of the servo burst duration. The difference can be remarkably detected by a transient detection circuit means and the differentiation of the signal detection in the hardware means support high speed system operation for the stable tracking. By easy isolation of the servo burst, it is possible to use the inter breaks as the additional data areas.

Figure 8:
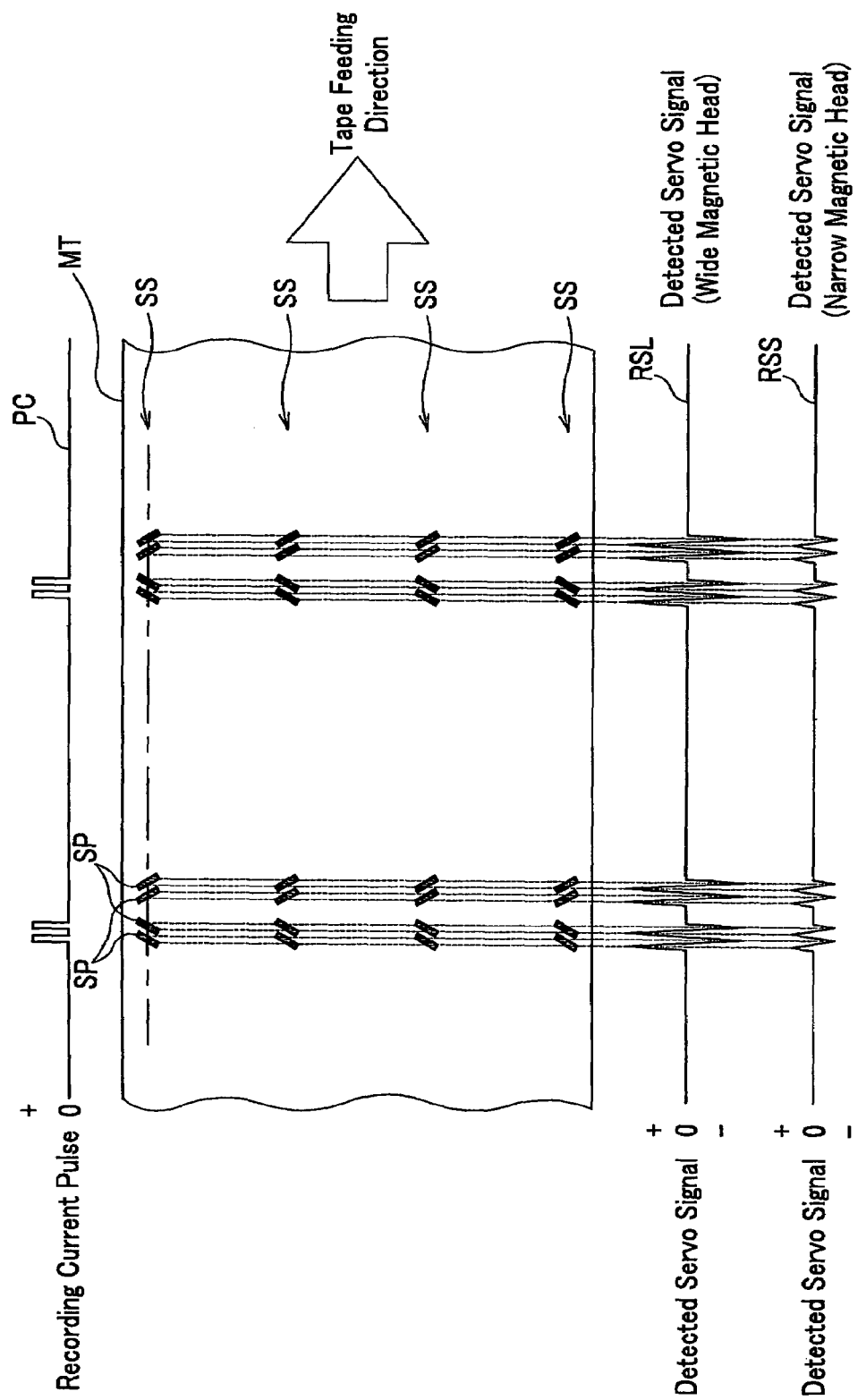
FIG. 8 is a schematic diagram that shows the servo band of the conventional magnetic tapes and the detected servo signals.

As described above, the servo stripes are generated background magnetic flux transition zone LZ1 with the reverse direction of the polarization of the magnetization to the background magnetic flux transition zone LZ1. Therefore, as shown in FIG. 8, the current detection RSL (which is detected servo signal) from the servo stripes generated on the zones where the background magnetic flux transition is generated is larger than the current detection RSS (which is detected servo signal) from the servo stripes generated on the zones where no magnetic flux transition is generated. Therefore the current pulses P1 to P8, which are detected by a magnetic flux transition reading transducer, can be enhanced so that the S/N of the current pulses detection of the servo stripes in the servo bands is improved and easily detected.

Figure 5A:
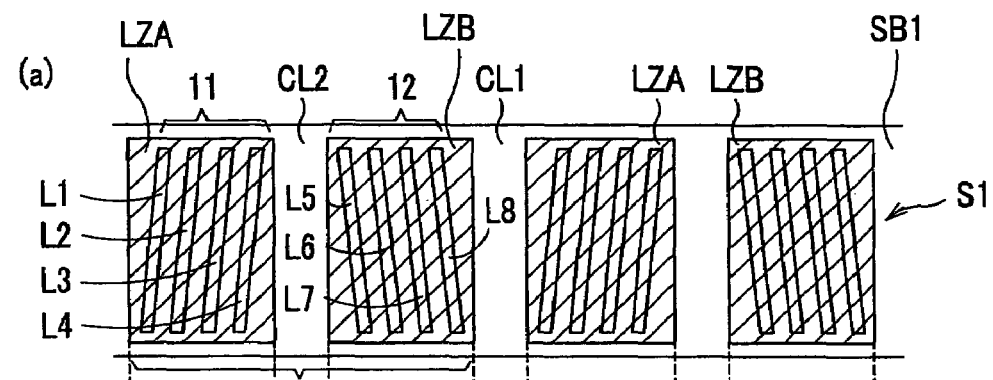
FIG. 5A is a schematic diagram that shows another servo band of the present invention.

The servo pattern of the second embodiment of the servo bands recorded magnetic tape regarding the present invention is as shown in FIG. 5A. Five servo bands SB1 to SB5 are generated in parallel to the longitudinal direction of the magnetic tape with equal separation and the data band DB1 to DB4 are formed (not shown in the figures) between two adjacent servo bands. FIG. 5A shows the enlarged view of the servo band SB1 on which a servo pattern is generated. The servo pattern is composed of a pair of background magnetic flux transition zones LZA and LZB, an inter break CL2 segregating the pair of background magnetic flux transition zones LZA and LZB and two set of servo stripes L1 to L4 and L5 to L8. One subframe is composed of a pair of background magnetic flux transition zones LZA and LZB and the inter break CL2 therebetween. Therefore the servo pattern is composed of the subframe and the inter break CL1, which is the same configuration as that of the first embodiment of the servo bands recorded magnetic tape regarding the present invention is as shown in FIG. 5A.

In the background magnetic flux transition zones LZA, four servo stripes L1 to L4 are generated in parallel with a magnetic polarization which is in the reverse direction (a negative polarization) against the magnetization of background magnetic flux transition zones LZA having a positive polarization. On the other hand, in the background magnetic flux transition zones LZB, four servo stripes L5 to L8 are generated in parallel with a magnetic polarization which is in the reverse direction (a negative polarization) against the magnetization of background magnetic flux transition zones LZB having a positive polarization. The servo stripes L1 to L4 composes the first servo burst 11 and those L5 to L8 the second servo burst 12. These two servo bursts have the different polarization of the magnetization of background magnetic flux transition zones as LZA and LZB, respectively. The generation of these servo stripes is same as in the first embodiment of the servo bands recorded magnetic tape regarding the present invention. Namely, the servo stripes that are formed in the first four servo stripes L1 to L4 slanted to the tape longitudinal direction and the second four servo stripes L5 to L8 slanted to the tape longitudinal direction where the four stripes are parallel within themselves and the second four slanted stripes are parallel within themselves but are not parallel between the first and the second four servo stripes.

The non-parallelism between the pairs as (L1, L5), (L2, L6), (L3, L7) and (L4, L8) are formed by the pair of non-parallel gaps G (see FIG. 3) which the magnetic flux servo transition writing head core SH has. All of the distances and shapes of these pairs of servo stripes are identically same since the distances and the shapes are generated by the pair of non-parallel gaps G which the magnetic flux servo transition writing head core SH has.

Figure 5B:
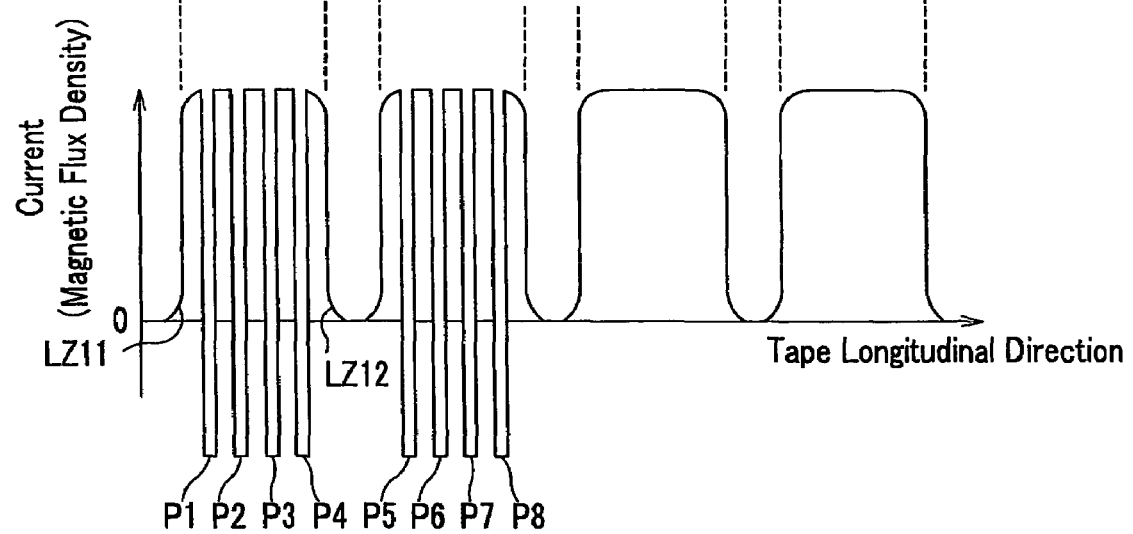
FIG. 5B is the detected current by the servo magnetic head sliding on the servo band shown in FIG. 5A.

As the result, the magnetic flux transition of the servo band SB1 has the background magnetic flux transition zones LZA and LZB in a positive direction of the predetermined intensity of magnetization polarization as shown in FIG. 5B (which is drawn with FIG. 5A to clarify the relation with the magnetic flux transitions and the detected current). The rising edge LZ11 and the falling edge LZ12 of the magnetic flux transitions are preferred to have transient areas along the longitudinal direction of the magnetic tape.

For this purpose, the current pulse generated by the background driving current generator LW based on the control of the controller SW5 has the predetermined time duration and time interval to generate the background magnetic flux transition zones LZA and LZB and has a transient term for the current increasing and decreasing at the pulse head and the pulse tail, respectively. The gradual transient of the magnetic flux transition at the background magnetic flux transition zones LZA and LZB generate gentle time-varying current sensed by means of the magnetic tape reading head at the pulse head and tail in comparison to the transition in the magnetic flux transition of the serve stripes. On the other hand, the transient of the magnetic flux transition at the edge of the servo stripe is from a positive direction of the predetermined intensity of magnetization to a negative direction of the predetermined intensity of magnetization. This characteristic is exploited for the servo burst detection as a high current peak in the servo burst detection but the low current peak in the inter breaks of the servo burst duration. The difference can be remarkably detected by a transient detection circuit means and the differentiation of the signal detection in the hardware means supports high speed system operation for the stable tracking.

As described above, the servo stripes are generated magnetic flux transition with the reverse direction of the polarization of the magnetization to the background magnetic flux transition zones LZA and LZB. Therefore, as shown in FIG. 8, the current detection RSL from the servo stripes generated on the zones where the background magnetic flux transition is generated is larger than the current detection RSS from the servo stripes generated on the zones where no magnetic flux transition is generated. Therefore the current pulses P1 to P8, which are detected by a magnetic flux transition reading transducer, can be enhanced so that the S/N of the current pulses detection of the servo stripes in the servo bands is improved and easily detected.

The servo pattern of the third embodiment of the servo bands recorded magnetic tape regarding the present invention is as shown in FIG. 6A. Five servo bands SB1 to SB5 are generated in parallel to the longitudinal direction of the magnetic tape with equal separation and the data band DB1 to DB4 are formed (not shown in the figures) between two adjacent servo bands. FIG. 6A shows the enlarged view of the servo band SB1 on which a servo pattern is generated. The servo pattern is composed of a background magnetic flux transition zones LZC and servo stripes L1 to L8. The servo stripes L1 to L4 compose the first servo burst 11 and those L5 to L8 the second servo burst 12.

The generation of these servo stripes L1 to L8 is same as in the first embodiment of the servo bands recorded magnetic tape regarding the present invention. Namely, the servo stripes that are formed in the first four servo stripes L1 to L4 slanted to the tape longitudinal direction and the second four servo stripes L5 to L8 slanted to the tape longitudinal direction where the four stripes are parallel within themselves and the second four slanted stripes are parallel within themselves but are not parallel between the first and the second four servo stripes.

Figure 7:
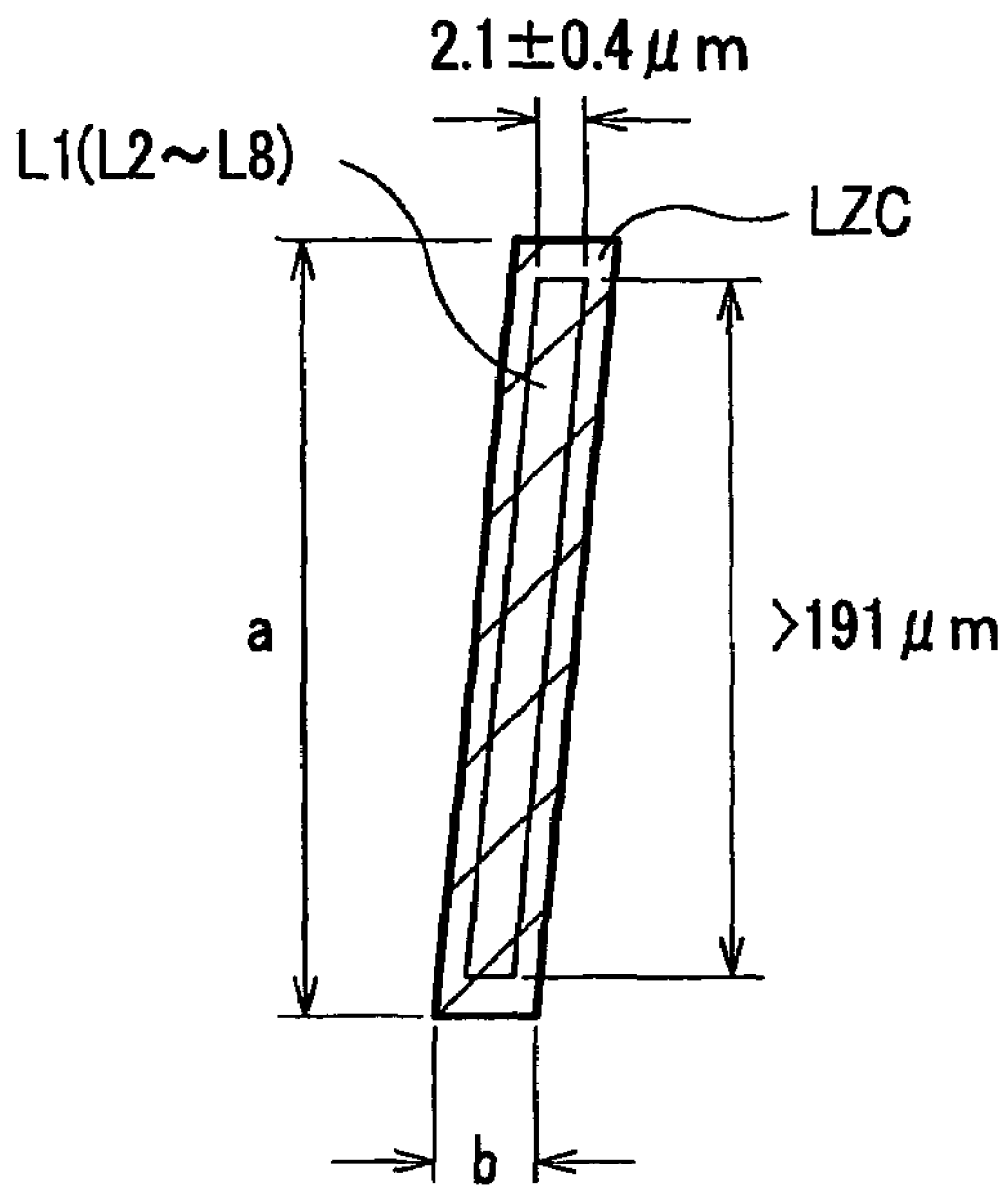
FIG. 7 is a schematic diagram that shows the servo stripes of the present invention are generated.

The non-parallelism between the pairs as (L1, L5), (L2, L6), (L3, L7) and (L4, L8) are formed by the pair of non-parallel gaps G (see FIG. 3) which the magnetic flux servo transition writing head core SH has. All of the distances and shapes of these pairs of servo stripes are identically same since the distances and the shapes are generated by the pair of non-parallel gaps G which the magnetic flux servo transition writing head core SH has. As shown in FIG. 7, each servo stripe has the pattern dimension as 2.1±0.4 µm in the tape longitudinal direction and larger than 191 µm in the lateral direction. The background magnetic flux transition zone LZC has the height a and the width b which are slightly larger than the pattern dimension of the servo stripe therefore the background magnetic flux transition zone LZC involves L1 to L8 within the each servo band.

The magnetic flux transition of the servo band SB1 has the background magnetic flux transition zone LZC in a positive direction of the predetermined intensity of magnetization as shown in FIG. 6B (which is drawn with FIG. 6A to clarify the relation with the magnetic flux transitions and the detected current). The rising edge LZ11 and the falling edge LZ12 of the magnetic flux transitions are preferred to have transient areas along the longitudinal direction of the magnetic tape. For this purpose, the current pulse generated by the background driving current generator LW based on the control of the controller SW5 has the predetermined time duration and time interval to generate the background magnetic flux transition zones LZ1 and has a transient term for the current increasing and decreasing at the pulse head and the pulse tail, respectively. The gradual transient of the magnetic flux transition at the background magnetic flux transition zones LZ1 generates gentle time-varying current sensed by means of the magnetic tape reading head at the pulse head and tail in comparison to the transition in the magnetic flux transition of the serve stripes. On the other hand, the transient of the magnetic flux transition at the edge of the servo stripe is from a positive direction of the predetermined intensity of magnetization to a negative direction of the predetermined intensity of magnetization. This characteristic is exploited for the servo burst detection as a high current peak in the servo burst detection but the low current peak in the inter breaks of the servo burst duration. The difference can be remarkably detected by a transient detection circuit means and the differentiation of the signal detection in the hardware means support high speed system operation for the stable tracking. By easy isolation of the servo burst, it is possible to use the inter breaks formed in the additional data areas.

As described above, the servo stripes L1 to L8 are generated in the background magnetic flux transition zone LZC with the reverse direction of the polarization of the magnetization to the background magnetic flux transition zone LZC. Therefore, as shown in FIG. 8, the current detection RSL from the servo stripes generated on the zones where the background magnetic flux transition is generated is larger than the current detection RSS from the servo stripes generated on the zones where no magnetic flux transition is generated. Therefore the current pulses P1 to P8, which are detected by a magnetic flux transition reading transducer, can be enhanced so that the S/N of the current pulses detection of the servo stripes in the servo bands is improved and easily detected.

We have been explaining the case that background magnetic flux transition zone LZ (LZA, LZB, LZC) has the positive polarization of magnetization and the servo stripes have the negative polarization of magnetization. However the mutually reverse polarization of the magnetization both in the background magnetic flux transition zone LZ (LZA, LZB, LZC) and the servo stripes are possible. In the previous embodiments, the servo bursts are composed of four servo stripes but more servo stripes or less servo stripes are applicable to the magnetic tapes of the present invention.

The present invention has another advantage that the servo stripe pairs as (L1, L5), (L2, L6), (L3, L7) and (L4, L8) are formed in different distances of these pairs of servo stripes by magnetizing with the pair of non-parallel gaps G which have mutually different distances among the servo bands. By this differentiation of distances between two adjacent servo stripes, it may be possible to identify the servo band number or use the distances for the servo band descriptors. The present invention has a further advantage that the separation distance between the two adjacent servo bursts can be differentiated by controlling the durations or the quantities of the current pulse applied to the magnetic flux servo transition writing head core SH (see Reference 2). Then each servo band has a differentiated separation distance between the two servo bursts and such differentiation can be used as descriptor for the servo bands. The present invention has another further advantage that a new magnetic recording space is made in the separation distance between the two adjacent servo bursts.

What is claimed is:

1. A magnetic tape having a recording format which comprises data bands and servo bands, wherein
    each of said servo bands comprises a plurality of servo patterns between each of which there is formed an inter break where magnetic flux is not detected, and
    each of said servo patterns is formed with a background magnetic flux transition zone uniformly magnetized in a polarity of magnetization along longitudinal direction of said magnetic tape and magnetic flux servo transition stripes generated in a reverse polarity of magnetization within said background magnetic flux transition zone.

2. A magnetic tape according to claim 1, wherein a servo band ID is additionally formed between two groups of said magnetic flux servo transition stripes in said reverse polarity of magnetization.

3. A magnetic tape according to claim 1, wherein a rising edge and a falling edge of said background magnetic flux transition zone have transient areas along the longitudinal direction thereof.

4. A magnetic tape according to claim 1, wherein a set of a plurality of said magnetic flux servo transition stripes which are in parallel and slanted to longitudinal direction of said tape is generated within said background magnetic flux transition zone and another set of said magnetic flux servo transition stripes which are in parallel and slanted to longitudinal direction of said tape is generated within another background magnetic flux transition zone.

5. A magnetic tape according to claim 4, wherein rising edges and falling edges of said background magnetic flux transition zone and said another background magnetic flux transition zone have transient areas along the longitudinal direction thereof.

6. A magnetic tape according to claim 1, wherein a number of said magnetic flux servo transition stripes generated in said background magnetic flux transition zone is one (1).

7. A magnetic tape according to claim 6, wherein said magnetic flux servo transition stripes have pattern dimension as 2.1±0.4 μm in a longitudinal direction and larger than 191 μm in a lateral direction thereof.

8. A magnetic tape according to claim 1, wherein a separation distance between a stripe in a first set of a plurality of said magnetic flux servo transition stripes and a stripe in a second set of plurality of said magnetic flux servo transition stripes is made to identify said servo band.

9. A magnetic tape according to claim 1, wherein said background magnetic flux transition zone is a zone recorded by using a first writing head gap, and said magnetic flux servo transition stripes are stripes written over said background magnetic flux transition zone by using a second writing head gap located downstream, with respect to a running direction of said magnetic tape, of said first writing head gap.

10. A magnetic tape according to claim 1, wherein said background magnetic flux transition zone is broader than said magnetic flux servo transition stripes in a width measured in a lateral direction of said magnetic tape.

11. A magnetic tape according to claim 1, wherein said magnetic flux servo transition stripes comprise a first set of stripes which are parallel to each other and slanted to longitudinal direction of said tape and a second set of stripes which are in parallel to each other, and wherein said stripes in the first set are not parallel with said stripes in the second set.

12. A manufacturing method of a magnetic tape having a recording format which comprises data bands and servo bands, the method comprising forming a plurality of servo patterns on each of said servo bands, wherein the forming of said servo patterns comprises:
generating, for each of said servo patterns, a background magnetic flux transition zone uniformly magnetized in a polarity of magnetization along longitudinal direction of said magnetic tape such that an inter break, where magnetic flux is not detected, lies between each of generated background magnetic flux transition zones; and
generating magnetic flux servo transition stripes in a reverse polarity of magnetization within said background magnetic flux transition zone.

13. A manufacturing method of a magnetic tape according to claim 12, wherein a servo band ID is formed between two groups of said magnetic flux servo transition stripes in said reverse polarity of magnetization in the generating of said magnetic flux servo transition stripes.

14. A manufacturing method of a magnetic tape according to claim 12, wherein a set of a plurality of said magnetic flux servo transition stripes which are in parallel and slanted to longitudinal direction of said tape is generated within said background magnetic flux transition zone and another set of said magnetic flux servo transition stripes which are in parallel and slanted to longitudinal direction of said tape is generated within said background magnetic flux transition zone.

15. A manufacturing method of a magnetic tape according to claim 12, wherein, a separation distance between a stripe in a first set of a plurality of said magnetic flux servo transition stripes and a stripe in a second set of plurality of said magnetic flux servo transition stripes is made to identify said servo band.

16. A manufacturing method of a magnetic tape according to claim 12, wherein said generating a background magnetic flux transition zone includes using a first writing head gap; and said generating magnetic flux servo transition stripes includes using a second writing head gap located downstream, with respect to a running direction of said magnetic tape, of said first writing head gap.

17. A manufacturing method of a magnetic tape according to claim 12, wherein the forming of said servo patterns further comprises making such an arrangement to at least one of said generating a background magnetic flux transition zone and said generating magnetic flux servo transition stripes as to make said background magnetic flux transition zone broader than said magnetic flux servo transition stripes in a width measured in a lateral direction of said magnetic tape.

18. A manufacturing method of a magnetic tape according to claim 12, wherein said magnetic flux servo transition stripes comprise a first set of stripes which are parallel to each other and slanted to longitudinal direction of said tape and a second set of stripes which are in parallel to each other, and wherein said stripes in the first set are not parallel with said stripes in the second set.

19. A servo writer to form servo bands, each servo band comprising a plurality of servo patterns on a magnetic tape, the servo writer comprising:
a magnetic background writing head gap to generate, for each of said servo patterns, a background magnetic flux transition zone in a polarity of magnetization along longitudinal direction of said magnetic tape such that an inter break, where magnetic flux is not detected, lies between each of generated background magnetic flux transition zones; and
a magnetic flux servo transition writing head gap to generate magnetic flux servo transition strips in a reverse polarity of magnetization within said background magnetic flux transition zone.

20. A servo writer according to claim 19, wherein
said magnetic background writing head gap to generate said background magnetic flux transition zones is set in an upper stream portion of said tape feeding and said magnetic flux servo transition writing head gap to generate magnetic flux servo transition stripes is set in a down stream portion of said tape feeding.

21. A servo writer according to claim 19, wherein
a servo band ID is additionally formed between two groups of said magnetic flux servo transition stripes in said reverse polarity of magnetization.

22. A servo writer according to claim 19, which has further function to made separation distance between a stripe in a first set of a plurality of said magnetic flux servo transition stripes and a stripe in a second set of plurality of said magnetic flux servo transition stripes in order to identify said servo band in addition to said capability to form said recording format.

23. A servo writer according to claim 19, wherein said magnetic flux servo transition writing head gap is shorter in length than said magnetic background writing head gap and is so disposed as to cause, in each of said servo patterns, said background magnetic flux transition zone to enclose the entirety of said magnetic flux servo transition strips.

24. A servo writer according to claim 19,
wherein said magnetic flux servo transition stripes comprise a first set of stripes which are parallel to each other and slanted to longitudinal direction of said tape and a second set of stripes which are in parallel to each other, and
wherein said stripes in the first set are not parallel with said stripes in the second set.

25. A servo band writing method comprising forming a plurality of servo patterns on servo bands of a magnetic tape, wherein the forming of said servo patterns comprises:
generating, for each of said servo patterns, a background magnetic flux transition zone uniformly magnetized in a polarity of magnetization along longitudinal direction of said magnetic tape by using a magnetic background writing head gap such that an inter break, where magnetic flux is not detected, lies between each of generated background magnetic flux transition zones; and
generating magnetic flux servo transition stripes in a reverse polarity of magnetization within said background magnetic flux transition zone using a magnetic flux servo transition writing head gap.

26. A servo band writing method according to claim 25, wherein
a servo band ID is formed between two groups of said magnetic flux servo transition stripes in said reverse polarity of magnetization in the generating of said magnetic flux servo transition stripes.

27. A servo band writing method according to claim 25, wherein
timing of feeding speed of said magnetic tape is controlled for current pulse repetition time after relative lateral positioning of said magnetic background writing head gap to said magnetic flux servo transition writing head gap is adjusted to keep alignment of said background magnetic flux transition zone and said magnetic flux servo transition stripes onto said servo bands.

28. A servo band writing method of a servo writer according to claim 25, wherein
a separation distance between a stripe in a first set of a plurality of said magnetic flux servo transition stripes and a stripe in a second set of plurality of said magnetic flux servo transition stripes is made to identify said servo band.

29. A servo band writing method according to claim 25, wherein the forming of said servo patterns further comprises making such an arrangement to at least one of said generating a background magnetic flux transition zone and said generating magnetic flux servo transition stripes as to make said background magnetic flux transition zone broader than said magnetic flux servo transition stripes in a width measured in a lateral direction of said magnetic tape.

30. A servo writing method according to claim 25,
wherein said magnetic flux servo transition stripes comprise a first set of stripes which are parallel to each other and slanted to longitudinal direction of said tape and a second set of stripes which are in parallel to each other, and
wherein said stripes in the first set are not parallel with said stripes in the second set.

* * * * *